(12) United States Patent
Nguyen et al.

(10) Patent No.: US 7,577,959 B2
(45) Date of Patent: Aug. 18, 2009

(54) PROVIDING ON-DEMAND CAPABILITIES USING VIRTUAL MACHINES AND CLUSTERING PROCESSES

(75) Inventors: Lu Nguyen, San Jose, CA (US); Jeffry Lynn Larson, Tracy, CA (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 10/875,660

(22) Filed: Jun. 24, 2004

(65) Prior Publication Data

US 2005/0289540 A1   Dec. 29, 2005

(51) Int. Cl.
G06F 9/455 (2006.01)
G06F 9/46 (2006.01)
G06F 15/16 (2006.01)
G06F 15/173 (2006.01)
G06F 11/00 (2006.01)

(52) U.S. Cl. ............... 718/105; 718/1; 718/100; 718/104; 709/203; 709/224; 709/225; 709/226; 709/229; 714/2; 714/4; 714/7; 714/47

(58) Field of Classification Search ............... 718/1, 718/100, 104, 105, 101, 102, 103; 714/4, 714/2, 7, 13, 47; 709/203, 206, 207, 224, 709/225, 226, 229

See application file for complete search history.

(56) References Cited

U.S. PATENT DOCUMENTS

| | | | | |
|---|---|---|---|---|
| 6,151,688 A | * | 11/2000 | Wipfel et al. | 714/48 |
| 6,223,202 B1 | * | 4/2001 | Bayeh | 718/102 |
| 6,236,999 B1 | * | 5/2001 | Jacobs et al. | 707/10 |
| 6,609,213 B1 | * | 8/2003 | Nguyen et al. | 714/4 |
| 6,618,737 B2 | | 9/2003 | Aridor et al. | |
| 6,728,896 B1 | * | 4/2004 | Forbes et al. | 714/4 |
| 6,732,139 B1 | * | 5/2004 | Dillenberger et al. | 718/102 |
| 6,742,100 B1 | * | 5/2004 | Schnee et al. | 711/173 |

(Continued)

FOREIGN PATENT DOCUMENTS

EP    0 910 017    4/1999

(Continued)

OTHER PUBLICATIONS

Xuxian Jiang, Dongyan Xu; SODA: a service-on-demand architecture for application service hosting utility platforms; High Performance Distributed Computing, 2003. Proceedings. 12th IEEE International Symposium on; Publication Date: Jun. 22-24, 2003; On pp. 174-183.*

(Continued)

*Primary Examiner*—Van H Nguyen
*Assistant Examiner*—Abdullah Al Kawsar
(74) *Attorney, Agent, or Firm*—Janaki Davda; Konrad Raynes & Victor LLP

(57) ABSTRACT

Techniques are provided for on-demand resource allocation in a cluster having at least one initial virtual machine. It is determined that resource requirements have changed. At least one new virtual machine is created on at least one physical machine based on the changed resource requirements. The at least one new virtual machine is added to the initial cluster. Transactions for the at least one initial virtual machine are failed over to the at least one new virtual machine.

23 Claims, 5 Drawing Sheets

U.S. PATENT DOCUMENTS

| | | | |
|---|---|---|---|
| 6,745,312 B1 * | 6/2004 | Schnee et al. | 711/173 |
| 6,854,114 B1 * | 2/2005 | Sexton et al. | 718/1 |
| 6,854,115 B1 * | 2/2005 | Traversat et al. | 718/1 |
| 6,857,012 B2 * | 2/2005 | Sim et al. | 709/222 |
| 6,934,755 B1 * | 8/2005 | Saulpaugh et al. | 709/226 |
| 7,185,223 B2 * | 2/2007 | Hsu et al. | 714/6 |
| 7,203,700 B1 * | 4/2007 | Kumar et al. | 707/103 R |
| 7,203,944 B1 * | 4/2007 | van Rietschote et al. | 718/104 |
| 7,206,836 B2 * | 4/2007 | Dinker et al. | 709/224 |
| 7,213,246 B1 * | 5/2007 | van Rietschote et al. | 718/1 |
| 7,287,186 B2 * | 10/2007 | McCrory et al. | 714/13 |
| 7,313,793 B2 * | 12/2007 | Traut et al. | 718/1 |
| 7,437,460 B2 * | 10/2008 | Chidambaran et al. | 709/226 |
| 2002/0013802 A1 * | 1/2002 | Mori et al. | 709/1 |
| 2003/0005068 A1 * | 1/2003 | Nickel et al. | 709/208 |
| 2003/0037134 A1 | 2/2003 | Hickman | |
| 2003/0195931 A1 * | 10/2003 | Dauger | 709/205 |
| 2004/0066741 A1 * | 4/2004 | Dinker et al. | 370/216 |
| 2004/0243650 A1 * | 12/2004 | McCrory et al. | 707/203 |
| 2005/0108593 A1 * | 5/2005 | Purushothaman et al. | 714/4 |
| 2005/0125557 A1 * | 6/2005 | Vasudevan et al. | 709/239 |
| 2005/0165925 A1 * | 7/2005 | Dan et al. | 709/224 |
| 2005/0171752 A1 * | 8/2005 | Patrizio et al. | 703/17 |
| 2005/0234846 A1 * | 10/2005 | Davidson et al. | 707/1 |
| 2005/0251567 A1 * | 11/2005 | Ballew et al. | 709/223 |
| 2006/0161637 A1 * | 7/2006 | Friess et al. | 709/218 |

FOREIGN PATENT DOCUMENTS

| | | |
|---|---|---|
| WO | WO 00/28421 | 5/2000 |

OTHER PUBLICATIONS

Andrew Whitaker, Marianne Shaw, and Steven D. Gribble; Denali: A Scalable Isolation Kernal; ACM SIGOPS European Workshop archive Proceedings of the 10th workshop on ACM SIGOPS European workshop;pp. 10-15; Year of Publication: 2002.*

Justin Moore, David Irwin, Laura Grit, Sara Sprenkle, and Jeff Chase; Managing Mixed-Use Clusters with Cluster-on-Demand; Internet Systems and Storage Group Software architectures for Internet-scale computing; Nov. 20, 2002; pp. 1-12.*

Jeffrey S. Chase, David E. Irwin, Laura E. Grit, Justin D. Moore, and Sara E. Sprenkle; Dynamic virtual clusters in a grid site manager; High Performance Distributed Computing, 2003. Proceedings. 12th IEEE International Symposium on; pp. 90-100.*

Wenzhang Zhu, Cho-Li Wang, and Francis C. M. Lau; Jessica2: A Distributed Java Virtual Machine with Transparent Thread Migration Support; IEEE 2002; pp. 1-8.*

Singer, M. "*Big Blue Takes 5, Advances Power Line.*" Internet News. Oct. 14, 2003 [online] Available from http://www.internetnews.com/infra/article.php/3091601.

Aridor, Y., et al. "*A High Performance Cluster JVM Presenting a Pure Single System Image*," pp. 168-177. JAVA 2000, San Francisco, CA, USA, ACM 2000-1-58113-288-3/00.

IBM, Corp. "*Server Processor Wars: News from front line,*" 1 page, Oct. 21, 3003 [online] Available from http://w3-3.ibm.com/technology/news/2003/1021-processor-perspective.html.

Davis, J. *IBM Debuts Power5, 2 pages, Electronic News*, Oct. 14, 2003 [online] Available from http://www.reed-electronics.com/electronicnews/index.asp?layout=article&articleid=CA329285&spacedesc=news&rid=0&rme=0&cfd=1.

IBM Corp. "*Cluster Virtual Machine for Java,*" 17 pages [online] Available from wysiwyg://21/http://www.haifa.il.ibm.com/projects/systems/cjvm/index.htm, retrieved on Oct. 20, 2003.

IBM Corp. "*IBM Geographically Dispersed Parallel Sysplex (GDPS),*" 1 page [online] [retrieved on Mar, 25, 2004] Available from http://www-1.ibm.com/servers/eserver/zseries/announce/april2002/gdps.html.

Microsoft, Corp. "*Complete Overview. Windows NT Load Balancing (WLBS)-comparisons with: and Microsoft Cluster Service (MSCS)-comparisons with:*" 6 pages [online] [retrieved on Mar. 25, 2004] Available from http://www.microsoft.com/ntserver/productinfo/enterprise/clustering/completeoverview.asp?bprint=true.

VMware. "*Products. VMware ESX Server 2,*" 3 pages [online] [retrieved on Mar. 25, 2004] Available from http://vmware.com/products/server/esx_features.html.

* cited by examiner

PROVIDING ON-DEMAND CAPABILITIES USING VIRTUAL MACHINES AND CLUSTERING PROCESSES

BACKGROUND

1. Field

Implementations of the invention relate to providing on-demand capabilities using virtual machines and clustering processes.

2. Description of the Related Art

Mainframe computers are large computers that include multiple processors and are capable of supporting many users simultaneously. Mainframe computers have the ability to dynamically allocate resources to different workloads. The term workload may be described as a set of transactions that a computer processes (e.g., database transactions or e-mail transactions). For example, if one processor fails, a mainframe computer is able to automatically restart a workload that had been executing on the failed processor on a new processor. Similarly, if the workload exceeds a first processor's capabilities, a mainframe computer is able to add a second processor for that workload.

However, there is a need in the art for on-demand processing on, for example, a server computer. On-demand processing may be described as adaptive computing, autonomic computing or utility computing. With on-demand processing, a system adapts itself to meet the requirements of a changing workload, usually without human intervention.

SUMMARY OF THE INVENTION

Provided are an article of manufacture, system, and method for on-demand resource allocation in a cluster having at least one initial virtual machine. It is determined that resource requirements have changed. At least one new virtual machine is created on at least one physical machine based on the changed resource requirements. The at least one new virtual machine is added to the initial cluster. Transactions for the at least one initial virtual machine are failed over to the at least one new virtual machine.

BRIEF DESCRIPTION OF THE DRAWINGS

Referring now to the drawings in which like reference numbers represent corresponding parts throughout.

DETAILED DESCRIPTION OF THE IMPLEMENTATIONS

In the following description, reference is made to the accompanying drawings which form a part hereof and which illustrate several implementations of the invention. It is understood that other implementations may be utilized and structural and operational changes may be made without departing from the scope of implementations of the invention.

Implementations of the invention simulate the on-demand processing that mainframe computers provide with an on-demand system that uses virtual machine software (e.g., VMWare ESX Server software available from VMWare, Inc.) and clustering software (e.g., Microsoft® Cluster Server software available from Microsoft Corporation).

Figure 1:
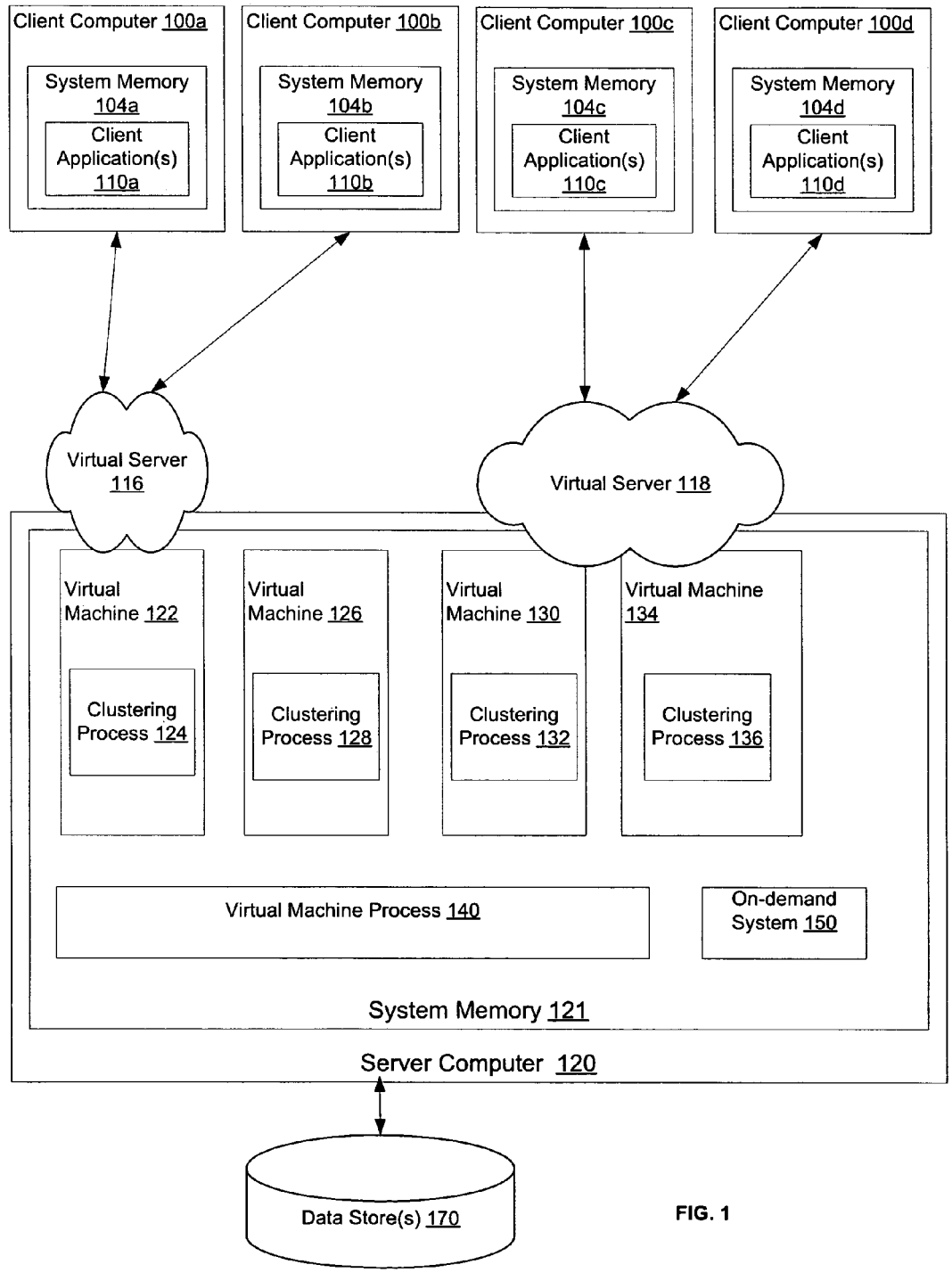
FIG. 1 illustrates a computing environment in which certain implementations of the invention are implemented.

FIG. 1 illustrates, in a block diagram, a computing environment in accordance with certain implementations of the invention. A virtual server 116, 118 may be described as a server computer with various programs that may be shared by multiple client computers that each see the virtual server as a physical server computer (i.e., a type of physical machine). The virtual machine process 140 allows a single server computer to perform the functions of multiple server computers. Additionally, multiple virtual servers may exist for a single physical server computer 120. In FIG. 1, client computers 100a and 100b are connected to virtual server 116 via, for example, a network. Client computers 100c and 100d are connected to virtual server 118 via, for example, a network. The networks may each comprise any type of network, such as, for example, a Storage Area Network (SAN), a Local Area Network (LAN), Wide Area Network (WAN), the Internet, an Intranet, etc.

Each of the virtual servers 116, 118 may perform a different function. For example, virtual server 116 may provide e-mail services, while virtual server 118 may provide payroll services. Client computers 100a . . . d that wish to perform e-mail functions connect to virtual server 116. If a client computer 100a . . . 110d wanted to perform payroll functions as well or instead, the client computer 100a . . . 110d would connect to virtual server 118 as well or instead.

Each client computer 100a, 100b, 100c, 100d may comprise any computing device known in the art, such as a server, mainframe, workstation, personal computer, hand held computer, laptop telephony device, network appliance, etc. In certain implementations, each client computer 100a, 100b, 110c, 100d may include system memory 104a, 104b, 104c, 104d, respectively, which may be implemented in volatile and/or non-volatile devices. One or more client applications 110a, 110b, 110c, 110d may reside in system memory 104a, 104b, 104c, 104d, respectively, and may be executed on a processor (e.g., a Central Processing Unit (not shown)) at each respective client computer 100a, 100b, 100c, 100d.

The server computer 120 includes system memory 121, which may be implemented in volatile and/or non-volatile devices. Virtual machine 122, virtual machine 126, virtual machine 130, and virtual machine 134 are created on server computer 120 by virtual machine process 140. Each virtual machine 122, 126, 130, 134 includes a clustering process 124, 128, 132, 136, respectively. Additionally, an on-demand system 150 resides in system memory 121 and may be executed to create additional virtual machines and/or clusters. The on-demand system 150 also provides other capabilities, such as, for example, determining that resource requirements have changed.

The virtual machine process 140 is capable of running numerous virtual machines 122, 126, 130, 134 at a single server computer 120.

Each virtual machine 122, 126, 130, 134 may have its own operating system and IP address, and each virtual machine 122, 126, 130, 134 appears to be a separate physical machine to, for example, the client computers 100a, 100b, 100c, 100d. Each virtual machine 122, 126, 130, 134 is capable of emulating a complete hardware system having, for example, a hard drive, a network card, etc., although the virtual machines virtual machine 122, 126, 130, 134 may actually be sharing components of the hardware system, such as the hard drive.

The term physical machine may be described as any type of computing device, such as an appliance, a server computer, or a mainframe computer.

A cluster may be described as multiple physical and/or virtual machines acting together as one physical machine. Each physical and/or virtual machine may be referred to as a node. With implementations of the invention, a cluster is created, with each virtual machine 122, 126, 130, 134 being a node in the cluster.

Each clustering process 124, 128, 132, 136 manages cluster functions, such as node membership in the cluster, failover processing, and load balancing. For example, if a processor on a virtual machine 122, 126, 130, 134 fails, that processor's workload is automatically restarted on a new virtual machine 122, 126, 130, 134 (e.g., a clustering process 124, 128, 132, 136 on the new virtual machine may intercept transactions to the failed virtual machine). Each clustering process 124, 128, 132, 136 also has the ability to interact with an operating system. Each clustering process 124, 128, 132, 136 hides the cluster from the client computers 100a, 100b, 100c, 100d so that the client computers 100a, 100b, 100c, 100d each thinks that the one or more virtual machines are a single physical machine.

The server computer 120 provides the client computers 100a, 100b, 100c, 100d with access to data in one or more data stores 170. The data stores 170 may each include an array of storage devices, such as Direct Access Storage Devices (DASDs), Just a Bunch of Disks (JBOD), Redundant Array of Independent Disks (RAID), a virtualization device, etc.

The on-demand system 150 is capable of automatically creating a cluster having a virtual machine with more or fewer resources (e.g., CPUs, memory, etc.) and fail a workload over to the new virtual machine. For example, a company may wish to have a virtual machine with more resources created for a peak period, such as during the Christmas season or on Mother's day. In FIG. 1, virtual server 118 may be created with virtual machine 130. Then, during peak periods, virtual machine 134 may be created with more resources. Then, the processing performed by virtual machine 130 may be failed over to virtual machine 134 during the peak period. After the peak period is over, the on-demand system 150 is capable of automatically creating another node consisting of a virtual machine with fewer resources to reduce the number of processors that perform the workload. In certain implementations, once a cluster is created and put into production, the cluster is not deleted, because client computers may be connecting to the cluster. However, nodes within the cluster may be added or removed, and this is done transparently to the client computers. In certain implementations, the failover may be accomplished in a few seconds to a few minutes, depending on the size of the workload. Also, in FIG. 1, a virtual server 116 may be created with virtual machine 122 that performs processing independently of other virtual machines 126, 130, 134. Also, virtual machine 126 may be created as an additional resource (e.g., to be added to a cluster as needed to handle workloads). Moreover, separate virtual machines may be created in a new cluster, with a new IP address.

In certain implementations, a client computer 100a, 100b, 100c, 100d connects to a virtual cluster IP address of a cluster. The virtual cluster IP address then redirects a workload to an appropriate virtual machine 122, 126, 130, 134 (i.e., a node in the cluster). If that virtual machine 122, 126, 130, 134 should fail, a different virtual machine 122, 126, 130, 134 is able to take over and traffic from the client computer 100a, 100b, 100c, 100d is redirected to the new virtual machine 122, 126, 130, 134. When this technique is combined with the ability of the virtual machine process 140 to dynamically allocate resources to different virtual machines 122, 126, 130, 134, mainframe-like on-demand capabilities may be simulated.

Figure 2:
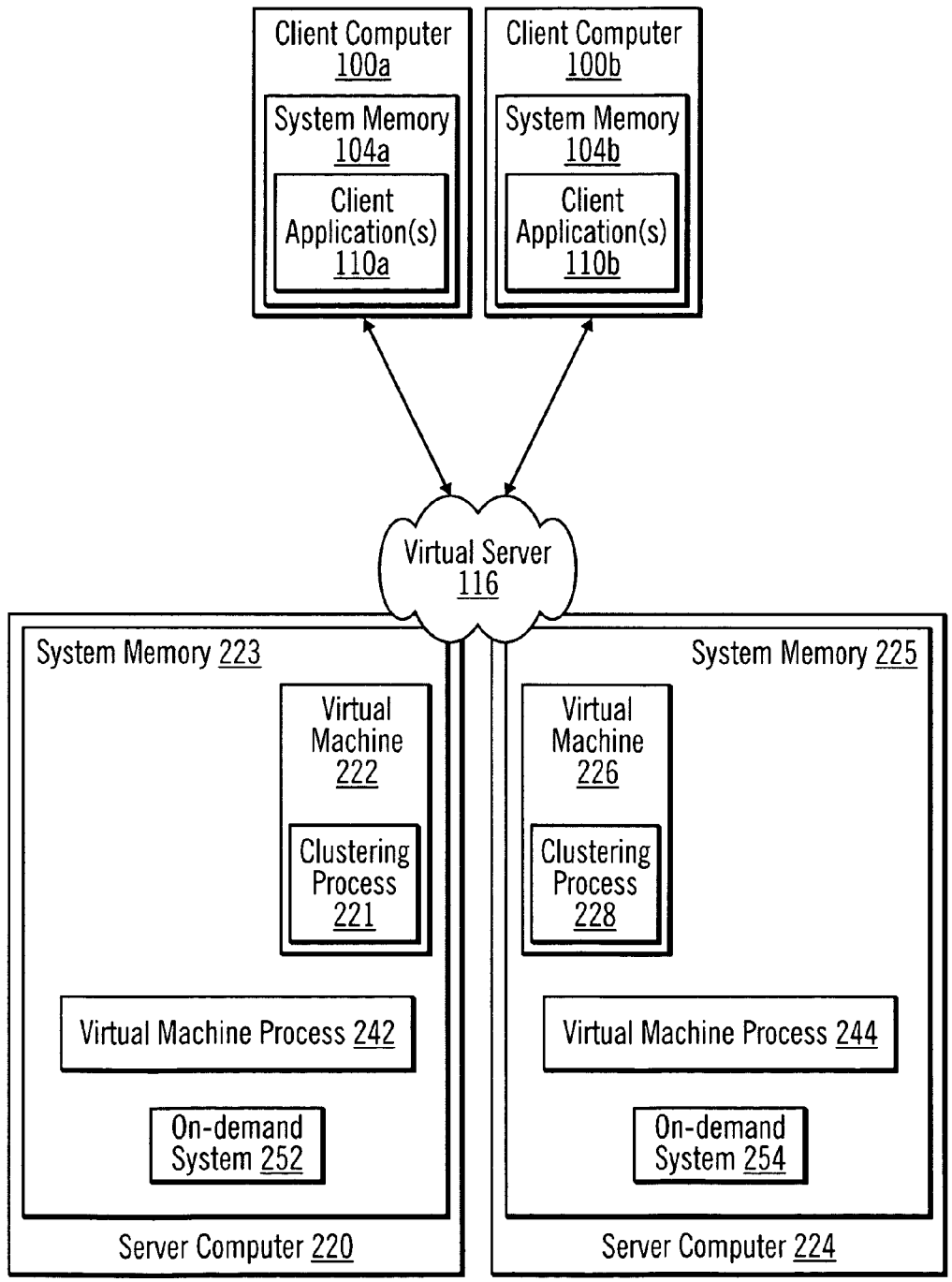
FIG. 2 illustrates a computing environment with geographically dispersed clusters in which certain implementations of the invention are implemented.

In certain implementations, the cluster is extended via geographically dispersed clustering with a clustering process to simulate mainframe software-like functions. One example of mainframe software is a Geographically Dispersed Parallel Sysplex (GDPS) software available from International Business Machines Corporation. FIG. 2 illustrates a computing environment with geographically dispersed clusters in which certain implementations of the invention are implemented. For example, in FIG. 2, client computers 100a, 100b are connected to a virtual server 116, which is formed by server computer 220 and server computer 224. The server computers 220, 224 may be geographically dispersed. A first cluster is created at server computer 220 with virtual machine 222, which includes clustering process 221. A second cluster is created at server computer 224 with virtual machine 226, which includes clustering process 228. Each server computer 220, 224 also includes a virtual machine process 242, 244, respectively, an on-demand system 252, 254, respectively, and system memory 223, 225, respectively.

Figure 3A:
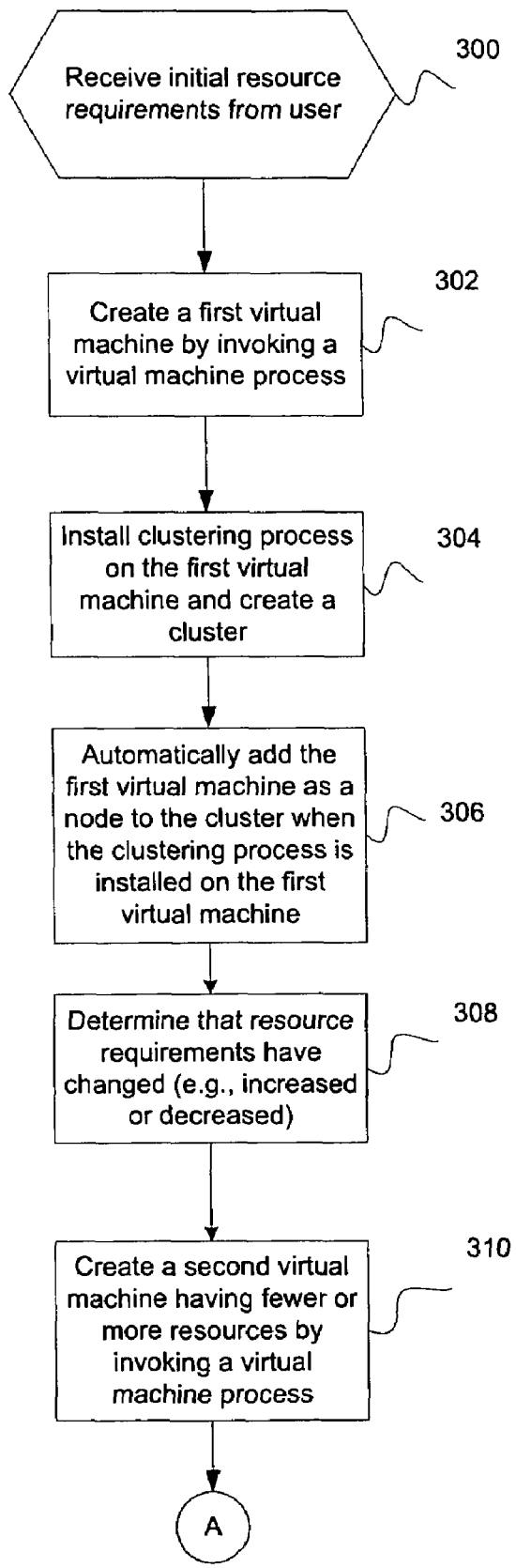
FIGS. 3A and 3B illustrate logic for on-demand capabilities in accordance with certain implementations of the invention.
Figure 3B:
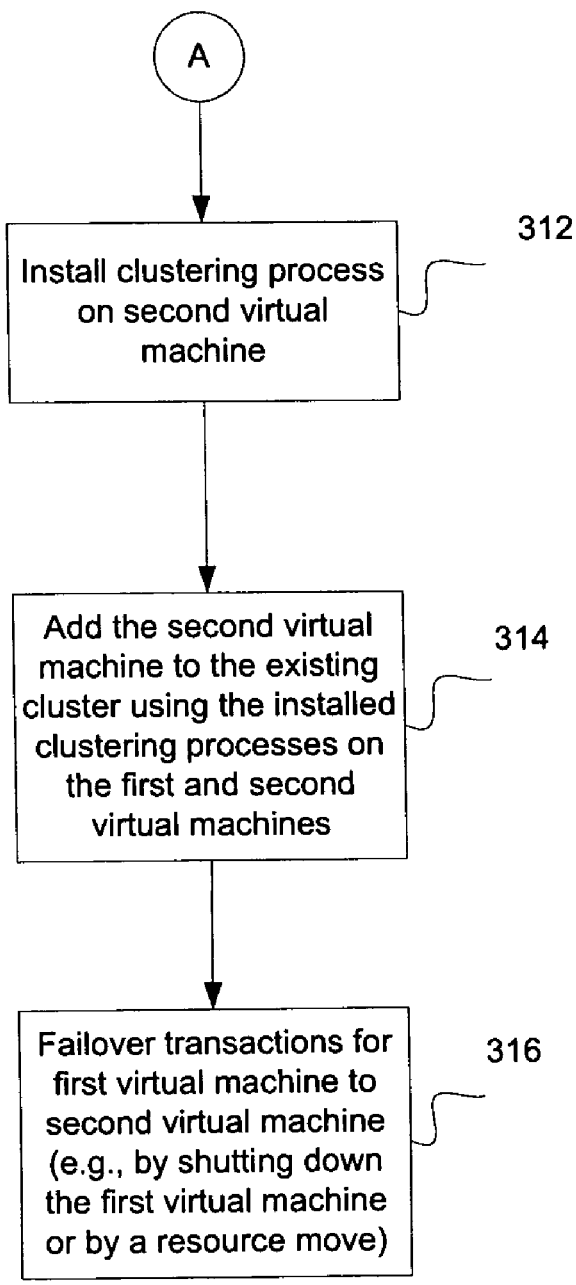

FIGS. 3A and 3B illustrate logic for on-demand capabilities in accordance with certain implementations of the invention. Initially, a physical machine (e.g., a server computer) with a certain number of resources is available for use. An on-demand system 150 is installed on the physical machine. In certain implementations, the on-demand system 150 provides a user interface to enable a user to issue commands. The on-demand system 150 invokes a virtual machine process and/or a clustering process to provide on-demand changes to for resource allocation.

In FIG. 3A, control begins at block 300 with the on-demand system 150 receiving initial resource requirements from a user via a user interface at, for example, installation time (e.g., installation of a business system at the server computer 120 for which the on-demand system 150 may monitor and change resources). The user interface may be, for example, a graphical user interface, a command line interface, or an application programming interface. The resource requirements may indicate, for example, that a new partition that contains two processors and two gigabytes (GB) of memory is to be created. In block 302, the on-demand system 150 creates a first virtual machine by invoking a virtual machine process. The first virtual machine is created to match the resource requirements provided by the user. In block 304, a clustering process is installed on the first virtual machine and creates a cluster using the clustering process. In certain implementations, the clustering process is automatically installed by the on-demand system. In certain implementations, the clustering process is installed by a user, such as a system administrator. In block 306, the first virtual machine is automatically added by the clustering process as a node to the cluster when the clustering process is installed on the first virtual machine. The cluster has a virtual cluster IP address. At this time, the virtual cluster IP address is available to client computers, and client computers may submit transactions to the virtual cluster IP address.

In block 308, the on-demand system 150 determines that the resource requirements have changed (e.g., either increased or decreased). For example, the processing of block 308 may occur after the physical machine has been in production for some time. In certain implementations, the on-demand system 150 recognizes business policies and is able to compare current resources with the business policies to determine whether to increase or decrease resource allocations. For example, the on-demand system 150 is capable of recognizing that a virtual machine is rapidly approaching peak capability and may automatically allocate new resources to the virtual machine, if a review of the business policy and resource monitoring determines that this is desirable. As another example, a business policy may state that virtual machines should be allocated extra resources during the months of December and May, and the on-demand system 150 automatically performs this allocation in the specified months. In certain implementations, a user provides alternate resource requirements via the user interface provided by the on-demand system. For example, a user may want to increase resource requirements to four processors and four gigabytes of memory in the existing partition. In some situations, the user may want to increase resource requirements in anticipation of a peak period, rather than having the on-demand system 150 perform this operation after entering or during the peak period.

In block 310, the on-demand system 150 creates a second virtual machine having fewer or more resources (based on the determination in block 308) by invoking a virtual machine process. The second virtual machine may be created either on the same physical machine as the first virtual machine (e.g., where the second virtual machine has different resources than what is available on the first virtual machine) or on a different physical machine (e.g., one that is geographically distant from the first virtual machine or one that is not geographically distant from the first virtual machine). In block 312, a clustering process is installed on the second virtual machine (e.g., by the on-demand system 150 or by a user). In block 314, the on-demand system 150 adds the second virtual machine to the existing cluster that includes the first virtual machine by invoking the installed clustering processes on the first and second virtual machines. For example, the on-demand system 150 notifies the clustering process on the first virtual machine that the second virtual machine has been added.

In block 316, the on-demand system 150 causes transactions to the first virtual machine to failover to the second machine. In certain implementations, the on-demand system 150 may cause the failover by invoking the failover capability of the clustering process, or by shutting down the first virtual machine, which will cause the failover to occur automatically. In certain implementations, rather than invoking the failover capability of the clustering process, or by shutting down the first virtual machine, the on-demand system 150 performs a resource move. To perform a resource move for an application process, the on-demand system 150 shuts down the application process on the first virtual machine and restarts that application process on the second virtual machine. This is done non-disruptively by enabling client computers that connect to the virtual cluster IP address of the existing cluster to submit transactions to the virtual cluster IP address that automatically fail over to the second virtual machine. In particular, the clustering process on the second virtual machine may intercept transactions to the first virtual machine. Additionally, the resources of the first virtual machine are made available for future allocation to another virtual machine. Additionally, in certain implementations, increased or decreased resource usage may be logged and/or sent to a user, such as a system administrator, for billing or other purposes.

The logic of FIGS. 3A and 3B illustrate certain implementations, but the logic may be varied without departing from the scope of the invention. For example, in certain implementations, multiple virtual machines are initially created (block 302). Then, a cluster that includes the multiple virtual machines is created (block 306). Then, the clustering process on each of the virtual machines in the cluster is able to balance the workload (e.g., if one virtual machine receives a transaction and is busy, the clustering process on that virtual machine may forward the transaction to another virtual machine that is not busy). Additionally, one or more additional virtual machines may be created with a different number of resources (e.g., fewer or more than the resources available at the initially created virtual machines) (block 310). Next, processing may be failed over to the newly created one or more additional virtual machines (block 316).

In certain implementations, when transactions are failed over from multiple virtual machines to multiple virtual machines, a user may indicate a preference as to which virtual machine's transactions are to be failed over to which other virtual machine's transactions. For example, if initially virtual machines A and B are created, then virtual machines C and D are created, a user may specify that transactions for virtual machine A are to fail over to virtual machine C and that transactions for virtual machine B are to fail over to virtual machine D.

In certain implementations, a cluster may be geographically distributed. For example, initially, a virtual machine A may be created at physical machine A, while a virtual machine B is created at physical machine B, where physical machines A and B are at different geographic locations. Then, one cluster is created to include both virtual machine A and virtual machine B. Then, when resource requirements change, at least one virtual machine is created at one of the physical machines A, B. For example, a new virtual machine C may be created at physical machine A; new virtual machines C and D may be created at physical machines A and B, respectively; or virtual machines C and D may be created at physical machine B. In any case the one or more newly created virtual machines are added to the existing cluster, and transactions from the initially created virtual machines (A and B) are failed over to the newly created virtual machines.

In certain implementations, different virtual machines may be on different physical machines that are not geographically distributed. This may be used, for example, to provide additional hardware redundancy for higher availability, or to migrate a workload from a first physical machine to a second physical machine.

Microsoft is a registered trademark of Microsoft Corporation in the United States and/or other countries. VMWare is a registered trademark of VMWare, Inc. in the United States and/or other countries.

Additional Implementation Details

The described implementations may be implemented as a method, apparatus or article of manufacture using programming and/or engineering techniques to produce software, firmware, hardware, or any combination thereof. The terms "article of manufacture" and "circuitry" as used herein refer to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which embodiments are implemented may further be accessible through a transmission media or from a server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

The logic of FIGS. 3A and 3B describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 3A and 3B may be implemented in software, hardware, programmable and non-programmable gate array logic or in some combination of hardware, software, or gate array logic.

Figure 4:
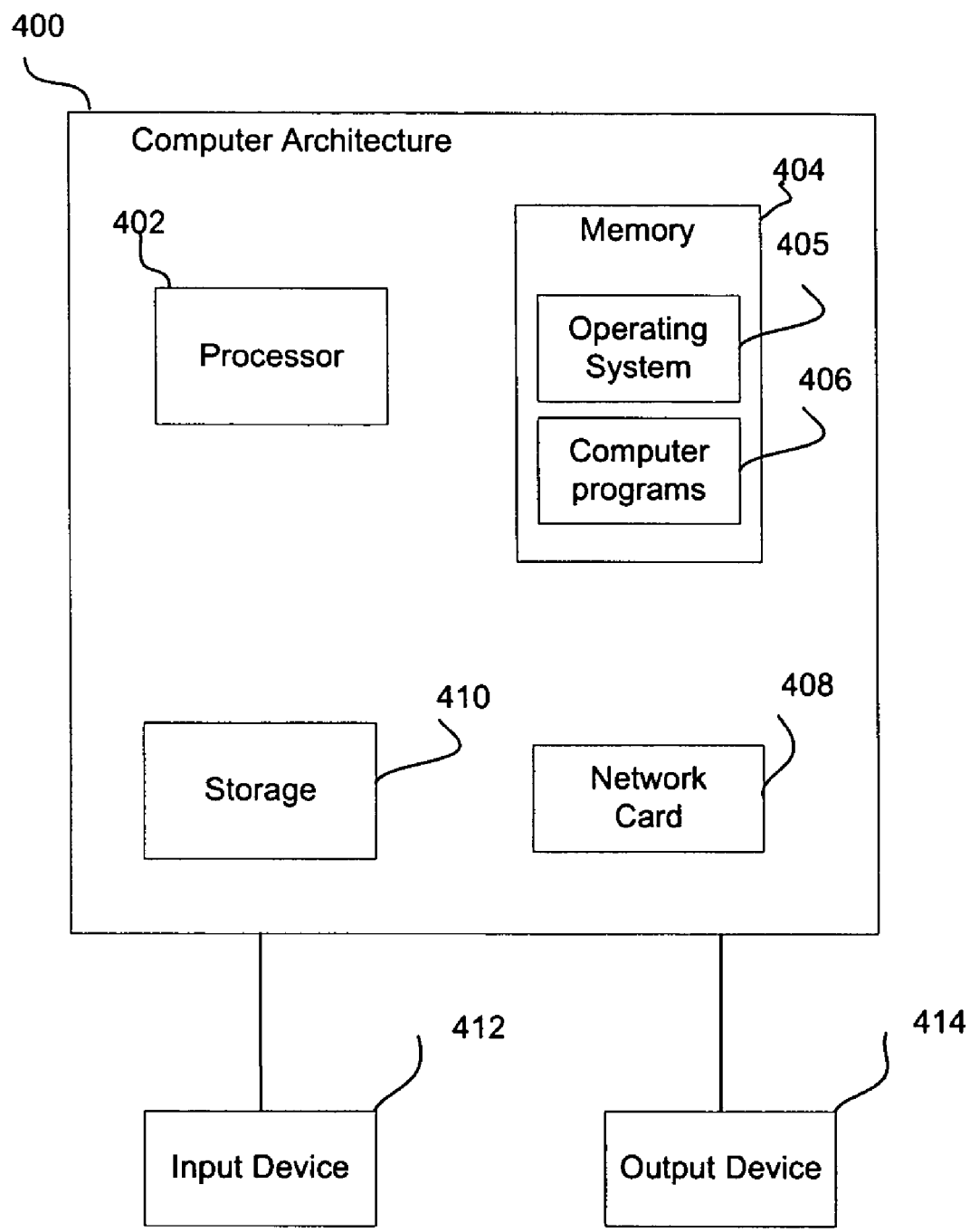
FIG. 4 illustrates an architecture of a computer system that may be used in accordance with certain implementations of the invention.

FIG. 4 illustrates an architecture 400 of a computer system that may be used in accordance with certain implementations of the invention. Client computers, server computers and/or SAN data systems may implement computer architecture 400. The computer architecture 400 may implement a processor 402 (e.g., a microprocessor), a memory 404 (e.g., a volatile memory device), and storage 410 (e.g., a non-volatile storage area, such as magnetic disk drives, optical disk drives, a tape drive, etc.). An operating system 405 may execute in memory 404. The storage 410 may comprise an internal storage device or an attached or network accessible storage. Computer programs 406 in storage 410 may be loaded into the memory 404 and executed by the processor 402 in a manner known in the art. The architecture further includes a network card 408 to enable communication with a network. An input device 412 is used to provide user input to the processor 402, and may include a keyboard, mouse, pen-stylus, microphone, touch sensitive display screen, or any other activation or input mechanism known in the art. An output device 414 is capable of rendering information from the processor 402, or other component, such as a display monitor, printer, storage, etc. The computer architecture 400 of the computer systems may include fewer components than illustrated, additional components not illustrated herein, or some combination of the components illustrated and additional components.

The computer architecture 400 may comprise any computing device known in the art, such as a mainframe, server, personal computer, workstation, laptop, handheld computer, telephony device, network appliance, virtualization device, storage controller, etc. Any processor 402 and operating system 405 known in the art may be used.

The foregoing description of implementations of the invention has been presented for the purposes of illustration and description. It is not intended to be exhaustive or to limit the implementations of the invention to the precise form disclosed. Many modifications and variations are possible in light of the above teaching. It is intended that the scope of the implementations of the invention be limited not by this detailed description, but rather by the claims appended hereto. The above specification, examples and data provide a complete description of the manufacture and use of the composition of the implementations of the invention. Since many implementations of the invention can be made without departing from the spirit and scope of the implementations of the invention, the implementations of the invention reside in the claims hereinafter appended or any subsequently-filed claims, and their equivalents.

What is claimed is:

1. A method for providing on-demand resource allocation in a cluster having at least one initial virtual machine, comprising:
   creating the at least one initial virtual machine by invoking a virtual machine process;
   installing a clustering process on the at least one initial virtual machine for managing cluster functions, wherein the cluster functions include node membership in the cluster, failover processing, and load balancing;
   using the clustering process on the at least one initial virtual machine to create the cluster using the clustering process on the at least one initial virtual machine and to add the at least one initial virtual machine as a node to the cluster;
   determining that resource requirements have increased or decreased since initial resource requirements for the at least one initial virtual machine were received; and
   in response to the determination,
      creating at least one new virtual machine on at least one physical machine based on the increased or decreased resource requirements by invoking the virtual machine process;
      installing a clustering process on the at least one new virtual machine to manage cluster functions, wherein the cluster functions include node membership in the cluster, failover processing, and load balancing;
      adding the at least one new virtual machine to the cluster that includes the at least one initial virtual machine by invoking the clustering process on the at least one initial virtual machine and the clustering process on the at least one new virtual machine; and
      failing over transactions for the at least one initial virtual machine to the at least one new virtual machine in the cluster to perform workload balancing based on the increased or decreased resource requirements, wherein the at least one new virtual machine processes the transactions, wherein failing over transactions further comprises performing a resource move, wherein performing the resource move includes shutting down an application process on the at least one initial virtual machine and restarting the application process on the at least one new virtual machine, wherein a client computer submits the transactions to a virtual cluster IP address of the cluster, and wherein the clustering process on the at least one new virtual machine intercepts the transactions to the at least one initial virtual machine submitted to the virtual cluster IP address.

2. The method of claim 1, further comprising:
   receiving the initial resource requirements for the at least one initial virtual machine from a user; and
   creating the at least one initial virtual machine based on the initial resource requirements by invoking the virtual machine process.

3. The method of claim 1, wherein determining that resource requirements have changed is automatically performed based on a business policy and on resource monitoring.

4. The method of claim 1, wherein determining that resource requirements have changed is performed in response to receiving new resource requirements from a user.

5. The method of claim 1, wherein the at least one new virtual machine has fewer resources than the at least one initial virtual machine.

6. The method of claim 1, wherein the at least one new virtual machine has more resources than the at least one initial virtual machine.

7. The method of claim 1, wherein failing over transactions further comprises:
   one of performing the resource move, shutting down the at least one initial virtual machine, which causes the failover to occur automatically, and invoking the failover capability of the clustering process of the at least one new virtual machine.

8. An article of manufacture comprising a computer readable medium storing code for providing on-demand resource allocation in a cluster having at least one initial virtual machine, wherein the code, when executed by a processor, causes operations to be performed, the operations comprising:
   creating the at least one initial virtual machine by invoking a virtual machine process;
   installing a clustering process on the at least one initial virtual machine for managing cluster functions, wherein the cluster functions include node membership in the cluster, failover processing, and load balancing;
   using the clustering process on the at least one initial virtual machine to create the cluster using the clustering process on the at least one initial virtual machine and to add the at least one initial virtual machine as a node to the cluster;
   determining that resource requirements have increased or decreased since initial resource requirements for the at least one initial virtual machine were received; and
   in response to the determination,
      creating at least one new virtual machine on at least one physical machine based on the increased or decreased resource requirements by invoking the virtual machine process;
      installing a clustering process on the at least one new virtual machine to manage cluster functions, wherein the cluster functions include node membership in the cluster, failover processing, and load balancing;
      adding the at least one new virtual machine to the cluster that includes the at least one initial virtual machine by invoking the clustering process on the at least one initial virtual machine and the clustering process on the at least one new virtual machine; and
      failing over transactions for the at least one initial virtual machine to the at least one new virtual machine in the cluster to perform workload balancing based on the increased or decreased resource requirements, wherein the at least one new virtual machine processes the transactions, wherein failing over transactions further comprises performing a resource move, wherein performing the resource move includes shutting down an application process on the at least one initial virtual machine and restarting the application process on the at least one new virtual machine, wherein a client computer submits the transactions to a virtual cluster IP address of the cluster, and wherein the clustering process on the at least one new virtual machine intercepts the transactions to the at least one initial virtual machine submitted to the virtual cluster IP address.

9. The article of manufacture of claim 8, wherein the operations further comprise:
   receiving the initial resource requirements for the at least one initial virtual machine from a user; and
   creating the at least one initial virtual machine based on the initial resource requirements by invoking the virtual machine process.

10. The article of manufacture of claim 8, wherein determining that resource requirements have changed is automatically performed based on a business policy and on resource monitoring.

11. The article of manufacture of claim 8, wherein determining that resource requirements have changed is performed in response to receiving new resource requirements from a user.

12. The article of manufacture of claim 8, wherein the at least one new virtual machine has fewer resources than the at least one initial virtual machine.

13. The article of manufacture of claim 8, wherein the at least one new virtual machine has more resources than the at least one initial virtual machine.

14. The article of manufacture of claim 8, wherein the operations for failing over transactions further comprise operations for:
   one of performing the resource move, shutting down the at least one initial virtual machine, which causes the failover to occur automatically, and invoking the failover capability of the clustering process of the at least one new virtual machine.

15. A system for providing on-demand resource allocation in a cluster having at least one initial virtual machine, comprising:
   hardware logic causing operations to be performed, the operations comprising:
   creating the at least one initial virtual machine by invoking a virtual machine process;
   installing a clustering process on the at least one initial virtual machine for managing cluster functions, wherein the cluster functions include node membership in the cluster, failover processing, and load balancing;
   using the clustering process on the at least one initial virtual machine to create the cluster using the clustering process on the at least one initial virtual machine and to add the at least one initial virtual machine as a node to the cluster;
   determining that resource requirements have increased or decreased since initial resource requirements for the at least one initial virtual machine were received; and
   in response to the determination,
      creating at least one new virtual machine on at least one physical machine based on the increased or decreased resource requirements by invoking the virtual machine process;
      installing a clustering process on the at least one new virtual machine to manage cluster functions, wherein the cluster functions include node membership in the cluster, failover processing, and load balancing;
      adding the at least one new virtual machine to the cluster that includes the at least one initial virtual machine by invoking the clustering process on the at least one initial virtual machine and the clustering process on the at least one new virtual machine; and
      failing over transactions for the at least one initial virtual machine to the at least one new virtual machine in the cluster to perform workload balancing based on the increased or decreased resource requirements, wherein the at least one new virtual machine processes the transactions, wherein failing over transactions further comprises performing a resource move, wherein performing the resource move includes shutting down an application process on the at least one initial virtual machine and restarting the application process on the at least one new virtual machine, wherein a client computer submits the transactions to a virtual cluster IP address of the cluster, and wherein the clustering process on the at least one new virtual machine intercepts the transactions to the at least one initial virtual machine submitted to the virtual cluster IP address.

16. The system of claim 15, wherein the operations further comprise:
   receiving the initial resource requirements for the at least one initial virtual machine from a user; and
      creating the at least one initial virtual machine based on the initial resource requirements by invoking the virtual machine process.

17. The system of claim 15, wherein determining that resource requirements have changed is automatically performed based on a business policy and on resource monitoring.

18. The system of claim 15, wherein determining that resource requirements have changed is performed in response to receiving new resource requirements from a user.

19. The system of claim 15, wherein the at least one new virtual machine has fewer resources than the at least one initial virtual machine.

20. The system of claim 15, wherein the at least one new virtual machine has more resources than the at least one initial virtual machine.

21. The system of claim 15, wherein the operations for failing over transactions further comprise operations for:
   one of performing the resource move, shutting down the at least one initial virtual machine, which causes the failover to occur automatically, and invoking the failover capability of the clustering process of the at least one new virtual machine.

22. The system of claim 15, wherein the hardware logic comprises:
   means for creating the at least one initial virtual machine by invoking the virtual machine process;
   means for installing the clustering process on the at least one initial virtual machine for managing cluster functions, wherein the cluster functions include node membership in the cluster, failover processing, and load balancing;
   means for using the clustering process on the at least one initial virtual machine to create the cluster using the clustering process on the at least one initial virtual machine and to add the at least one initial virtual machine as the node to the cluster;
   means for determining that the resource requirements have increased or decreased since initial resource requirements for the at least one initial virtual machine were received; and
   in response to the determination,
      means for creating the at least one new virtual machine on at least one physical machine based on the increased or decreased resource requirements by invoking the virtual machine process;
      means for installing the clustering process on the at least one new virtual machine to manage cluster functions, wherein the cluster functions include node membership in the cluster, failover processing, and load balancing;
      means for adding the at least one new virtual machine to the cluster that includes the at least one initial virtual machine by invoking the clustering process on the at least one initial virtual machine and the clustering process on the at least one new virtual machine; and
      means for failing over the transactions for the at least one initial virtual machine to the at least one new virtual machine in the cluster to perform workload balancing based on the increased or decreased resource requirements, wherein the at least one new virtual machine processes the transactions, wherein failing over transactions further comprises performing a resource move, wherein performing the resource move includes shutting down the application process on the at least one initial virtual machine and restarting the application process on the at least one new virtual machine, wherein the client computer submits the transactions to the virtual cluster IP address of the cluster, and wherein the clustering process on the at least one new virtual machine intercepts the transactions to the at least one initial virtual machine submitted to the virtual cluster IP address.

23. The system of claim 22, further comprising:
means for determining that resource requirements have changed based on a business policy and on resource monitoring.

* * * * *